United States Patent
Ariyama

(10) Patent No.: US 6,937,722 B2
(45) Date of Patent: Aug. 30, 2005

(54) METHOD AND APPARATUS FOR ECHO CANCELLATION

(75) Inventor: Yoshihiro Ariyama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 5 days.

(21) Appl. No.: 10/080,657

(22) Filed: Feb. 25, 2002

(65) Prior Publication Data

US 2002/0118822 A1 Aug. 29, 2002

(30) Foreign Application Priority Data

Feb. 26, 2001 (JP) ........................................ 2001-050729

(51) Int. Cl.[7] .............................................. H04M 9/08
(52) U.S. Cl. ............................ 379/406.01; 379/406.02; 379/406.05; 379/406.06; 379/406.08; 379/406.09; 379/406.11
(58) Field of Search ........................ 379/401.01–406.16

(56) References Cited

U.S. PATENT DOCUMENTS

| | | | | |
|---|---|---|---|---|
| 4,679,166 A | * | 7/1987 | Berger et al. ................... | 713/2 |
| 5,477,534 A | * | 12/1995 | Kusano ................. | 379/406.01 |
| 5,892,757 A | * | 4/1999 | Norrell et al. ......... | 379/406.01 |
| 5,960,077 A | * | 9/1999 | Ishii et al. ............. | 379/406.01 |
| 5,978,831 A | * | 11/1999 | Ahamed et al. ............. | 718/105 |
| 6,035,312 A | * | 3/2000 | Hasegawa .............. | 379/406.08 |
| 6,442,274 B1 | * | 8/2002 | Sugiyama .............. | 379/406.01 |

FOREIGN PATENT DOCUMENTS

| | | |
|---|---|---|
| JP | 05145447 | 6/1993 |
| JP | 08056254 | 2/1996 |
| JP | 08079136 | 3/1996 |
| JP | 11004288 | 1/1999 |

* cited by examiner

Primary Examiner—Sinh Tran
Assistant Examiner—Ramnandan Singh
(74) Attorney, Agent, or Firm—Michael A. Sartori; Jeffrey A. Kaminski; Venable, LLP.

(57) ABSTRACT

An echo canceler for generating an echo replica and subtracting the echo replica from a local input signal to create a residual signal for outgoing transmission. An echo canceler has adaptive filters that have different computational accuracy generating the echo replica. An evaluator coupled to the adaptive filters groups coefficients into each of segments, and evaluating a computational accuracy information according to the coefficients for the segments. A computational accuracy controller in the evaluator assigns the local input signal to the adaptive filters, and adjusts the coefficients according to the computational accuracy information.

16 Claims, 5 Drawing Sheets

METHOD AND APPARATUS FOR ECHO CANCELLATION

FIELD OF THE INVENTION

The present invention relates to an echo canceler, and more specifically to an echo canceler for canceling echo components in a local input signal of hands-free automobile telephone sets and international telephone circuit.

BACKGROUND OF THE INVENTION

Echo cancelers are used in communication devices such as hands-free automobile telephone sets. An echo canceler has a filter that computes a signal received from a far-end communication device, estimates the echo that the received signal will produce in the local input signal, and creates a replica of the estimated echo. The echo replica is subtracted from the local input signal so that the party at the far end will not hear an echo of his or her own voice.

The filter has tap coefficients that represent the transfer characteristics of the echo path. To deal with changes in the characteristics of the echo path, and with external noise, the tap coefficients are adjusted by an algorithm that attempts to reduce the residual echo left after echo cancellation. Two widely-used algorithms are the least mean squares (LMS) algorithm and the normalized least mean squares (NLMS) algorithm, both of which have the advantages of stable operation and comparatively light computational requirements.

The conventional echo canceler has the disadvantage, however, of extensive computation. According to the using environment, the echo path becomes long. When the echo path is created without decline of performance to cancel echo components, an adaptive filter requires more taps, and computational requirements become extensive. According to increase of computational requirements, more memory which store a signal received from a far-end communication device is required, and computational requirements of the adaptive filter become extensive. This is a disadvantage without regard to adaptive algorithm.

In an automobile telephone using the echo canceler, for example, the twice taps of a short term echo path are required to cancel echo components with the same accuracy as canceling short term echo components. At least, the twice computational requirements of canceling short term echo components is required to create the echo replica by the sample value of a signal received from a far-end communication device. This is the cause of the increase of computational requirements in the whole device. The echo canceler that can deal with the longer impulse response by setting the bit allocation of tap coefficients of adaptive filter have been proposed in echo canceler algorithm.

SUMMARY OF THE INVENTION

An object of the present invention is to provide an echo canceler that can deal with the longer impulse response by setting the bit allocation of tap coefficients of adaptive filter without demanding extensive computation.

According to one aspect of the present invention, for achieving the above object, there is provided, as a specific configuration, an echo canceler for generating an echo replica and subtracting the echo replica from a local input signal to create a residual signal for outgoing transmission comprising each of adaptive filters which has different computational accuracy generating the echo replica. An evaluator coupled to the adaptive filters groups coefficients into each of segments, and evaluating a computational accuracy information according to the coefficients for the segments. A computational accuracy controller in the evaluator assigns the local input signal to the adaptive filters, and adjusts the coefficients according to the computational accuracy information.

DESCRIPTION OF THE PREFFERED EMBODIMENTS

Embodiments of the invention will be described with reference to the attached exemplary drawings.

Figure 1:
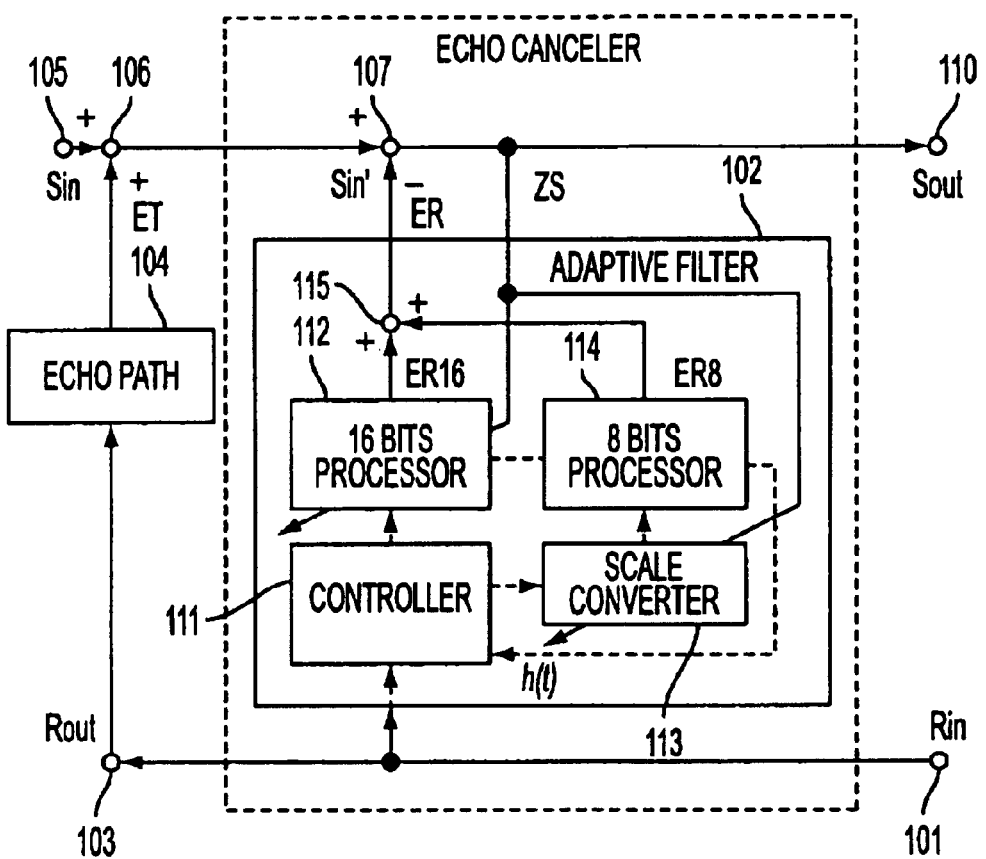
FIG. 1 is a block diagram of a first embodiment of the invention.

Referring to FIG. 1, in a first embodiment of the invention, an echo canceler comprises a local input terminal 101, a local output terminal 103, a local input terminal 105, a local output terminal 110, an echo path adder 106 and an echo canceler 108.

Rin is received from the far end at a local input terminal 101, supplied to an adaptive filter 102, and supplied in analog form to a local output terminal 103 linked to, for example, a loudspeaker, which creates the acoustic received signal Rout. Rout travels on an echo path 104 and becomes an acoustic echo signal ET, which is added to an acoustic signal Sin generated by a local signal source 105.

For example, the echo path 104 usually is indoor space to generate an echo by indoor echo when the echo canceler in this embodiment is used in hands-free automobile telephone sets in a car. In this embodiment the echo path 104 is provided for convenience, and it is not mandatory.

The echo canceler 108 cancels the echo components from a local input signal Sin' (=Sin+ET) including the echo signal ET, and creates an echo replica signal ER from the local input signal (digital signal) Rin, and subtracts the echo replica signal ER from the combined local input signal Sin' including echo from echo path adder 106, which is supplied to the local output terminal 110. Also, the echo canceler 108 has the adaptive filter 102 and an adder 107.

The adaptive filter 102 adjusts tap coefficients adaptively, and creates the echo replica ER according to the local input signal Rin and an echo residual signal ZS which are inputted from the local input terminal 101 by the sample.

The adaptive filter 102 analyzes the transfer characteristics, more specifically the impulse response, of the echo path 104, and creates an echo replica signal ER. The internal components of the adaptive filter 102, not shown in the drawing, include a coefficient register for storing tap coefficients, a sample register for storing consecutive sample values of the received signal Rin, and a multiplier for multiplying these sample values by the tap coefficients, thereby generating the echo replica signal ER. The adaptive filter 102 also has circuitry or other means for adjusting the tap coefficients in the coefficient register by, for example, the NLMS algorithm, to adapt to small or gradual changes in the transfer characteristics of the echo path 104.

The local input signal Rin and the tap coefficients of the adaptive filter are used to calculate the echo replica signal ER. According to the following equation (1), the echo replica signal ER is calculated adding all of the product of the local input signal Rin stored in a sample register (not shown) and the tap coefficients h(t) stored in a coefficients register (not shown).

$$ER=H(t)\times x(t) \quad (1)$$

The tap coefficients h(t) used in the adaptive filter 102 at time t estimates of the impulse response of the echo path 104 at time t. h(t) will be treated as a column vector, and H(t) as a row vector equal to the transpose of h(t). A series of consecutive samples of the far-end input signal Rin up to time t forms a column vector x(t) having the same size as h(t).

To cancel the echo components included in a combined local input signal Sin', the adder 107 subtracts the echo replica signal ER from the combined local input signal y(t) which is the scalar value of the combined local input signal Sin' at time t. The signal canceled echo components supplies to a local output signal Sout, and to the adaptive filter 102 again as the residual signal ZS which is the scalar signal. The residual signal ZS (=e(t)) is calculated using the following equation (2).

$$e(t)=y(t)-H(t)\times x(t) \quad (2)$$

e(t) is the scalar value of the residual signal ZS at time t, and y(t) is the scalar value of the combined local input signal Sin' at time t. H(t) as a row vector equal to the transpose of h(t).

In a first embodiment of the invention, the adaptive filter 102 comprises a controller 111, a 16 bits processor 112, a scale converter 113, a 8 bits processor 114, and an adder 115.

The controller 111 groups the tap coefficients into the segments corresponding to the transfer characteristics, more specifically the impulse response of the echo path 104, and calculates the power of the tap coefficients h(t) for the segments, and according to the tap coefficients h(t), supplies the local input signal and the calculated signal for the segments to the 16 bits processor 112 and the 8 bits processor 114 through the scale converter 113. It is possible to set the segments according to the whole computational requirements of system. For example, to reduce the whole computational requirements of system, the segments can be set as long as possible. To reflect the transfer characteristics, more specifically the impulse response of the echo path 104 precisely, the segments can be set as short as possible.

When the power of the tap coefficients h(t) for the segments is above a predetermined threshold at the time for adjusting the tap coefficients, the product for the segments is computed using the 16 bits processor 112 that is accurate and requires extensive computation. When the power of the tap coefficients h(t) for the segments is below the predetermined threshold at the time for adjusting the tap coefficients, the product for the segments is computed using the 8 bits processor 114 that does not require extensive computation. In this computation, the tap coefficients are 8 bits parameter. As described above, the product for the segments is assigned to the appropriate adaptive filter every segment according to the computational requirements for the segments.

Figure 2:
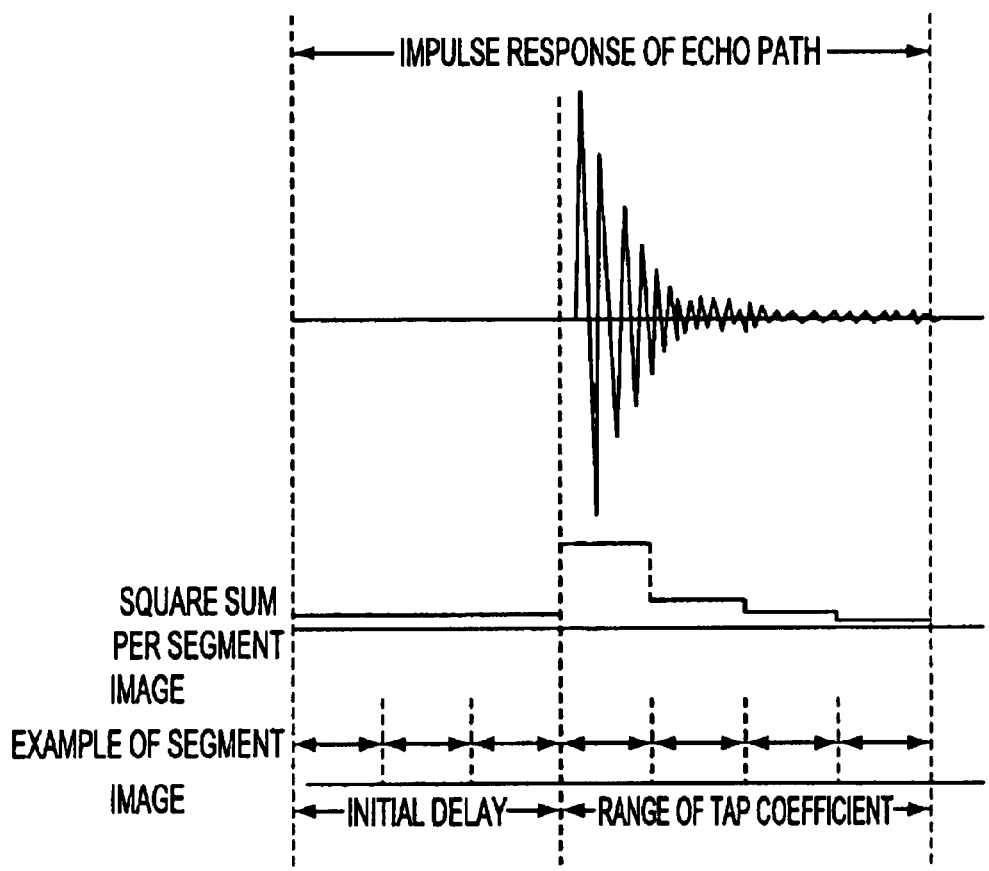
FIG. 2 shows a relation of echo path characteristics and a power of tap coefficients in segments.

FIG. 2 shows a relation of the transfer characteristics, more specifically the impulse response, of the echo path and the power of tap coefficients in segments.

Figure 3:
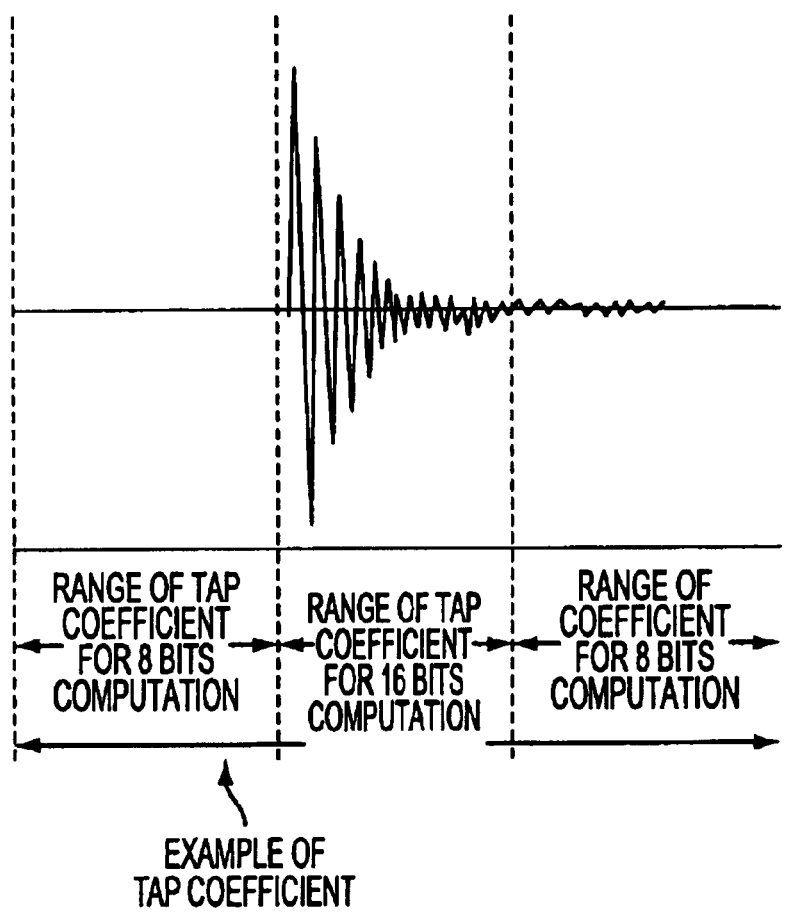
FIG. 3 shows a relation of echo path characteristics and computing assignment of adaptive filters.

FIG. 3 shows computing assignment of adaptive filters according to the echo path characteristics shown in FIG. 2.

As shown in FIG. 2, after initial delay, the transfer characteristics of the echo path has significant responses at the leading edge, and attenuates gradually.

As shown in FIG. 3, the transfer characteristics of the echo path shows the significant responses at the leading edge, and 16 bits computation is used for the impulse response at the leading edge, and 8 bits computation is used for the impulse response after the leading edge. That contributes to reducing of the computational requirements in whole system.

The tap coefficients are adjusted in the receiving single—talk situation. In the receiving single—talk situation, the local input signal Rin is an only valid signal. After the adjustment of the tap coefficients, according to the change of the transfer characteristics of the echo path, the tap coefficients can be adjusted adaptively. That contributes to creation of the appropriate echo replica ER outputted from the adaptive filter 102.

The 16 bits processor 112 creates an echo replica ER16 for the segments from the local input signal Rin and the residual signal ZS using the tap coefficients having 16 bits parameters.

The 8 bits processor 114 creates an echo replica ER8 for the segments from the local input signal Rin that converted to 8 bits in the scale converter 113 and the residual signal ZS using the tap coefficients having 8 bits parameters.

The processor is not limited to 8 bits processor and 16 bits processor. For example, it is possible to use 32 bits processor.

The 16 bits processor 112 and the 8 bits processor 114 are controlled by a control signal to select reintializing operations or normal operations. In normal operations, the echo replica ER is created while the tap coefficients are adjusted. In reintializing operations, adjustment of the tap coefficients is stopped, and the echo replica ER is created using initial tap coefficients.

The controller 111 supervises the power of the tap coefficients in the segments when the tap coefficients are adjusted, and in normal operations, calculates the power of the tap coefficients in the segments, and assigns the local input signal to each adaptive filter.

The scale converter 113 converts the signal supplied to the 8 bits processor 114 to 8 bits signal to compute in the adaptive filter 8 bits processor. The local input signal Rin for segments that has the power of the tap coefficients h(t) in the segments are below the predetermined threshold and the residual signal ZS are supplied to the 8 bits processor 114.

The tap coefficients h(t) used to create the echo replica ER are adjusted using the NLMS algorithm in the single—talk situation such that background noise is not mixed to the input signal. The tap coefficients h(t) is adjusted using the following equation (3) and (4).

$$h(t+1)=h(t)+[\alpha \times e(k) \times x(k)/\{X(t) \times x(t)+\beta\}] \quad (3)$$

α is a step-gain constant in the range 0<α<2, and β is a small positive constant added to prevent division by zero. X(t) is a row vector equal to the transpose of x(t).

The adder 115 adds the echo replica ER16 calculated by the 16 bits processor 112 to the echo replica ER8 calculated by the 8 bits processor 114 to create the echo replica signal ER used for subtracting the echo replica signal ER from the combined local input signal Sin'.

Next, the overall operation of the first embodiment will be described.

The local input signal Rin is supplied to the echo canceler 108 per sample. The local input signal Rin supplied from the echo canceler 108 is supplied to the adaptive filter 102 and the local output terminal 103.

A part of the local output signal Rout supplied from the local output terminal 103, as an echo signal ET, is supplied to the echo path adder 106 through the echo path 104, and added to the local input signal Sin', and outputted.

As described above, the local input signal Sin' is supplied to the echo canceler 108, and the adder 107 subtracts the echo replica signal ER from the local input signal Sin' and the tap coefficients h(t), by adding the complement of ER to Sin' and h(t) to produce an echo residual signal ZS.

The echo residual signal ZS that the echo components are canceled is supplied to the local output terminal 110, and supplied to the adaptive filter 102 to estimate appropriateness of the echo replica.

The adaptive filter 102 in the echo canceler 108 creates the echo replica signal ER according to the following computation.

The tap coefficients h(t) are grouped into segments at adjustment of h(t), stored in the 16 bits processor 112 or the 8 bits processor 114.

The power of the stored tap coefficients h(t) is calculated in the controller 111.

When the power of the tap coefficients h(t) for the segments is above the predetermined threshold, the local input signal Rin is supplied to the 16 bits processor 112 that is accurate and requires extensive computation. When the power of the tap coefficients h(t) for the segments is below the predetermined threshold, the local input signal Rin is supplied to the 8 bits processor 114 that dose not require extensive computation.

To convert the signal series, which will be computed, to 8 bits signal, the local input signal Rin is supplied to the 8 bits processor 114 through the scale converter 113.

The local input signal Rin which is assigned to the 16 bits processor 112 or the 8 bits processor 114 according to the instruction from the controller 111 is multiplied by the tap coefficients h(t) stored in the 16 bits processor 112 or the 8 bits processor 114, and the echo replica ER16 or the echo replica ER8 is supplied to the adder 115.

The adder 115 calculates the sum of the echo replica ER16 and the echo replica ER8, and creates the echo replica ER.

According to the transfer characteristics of the echo path, the tap coefficients are grouped into the segments, and according to the power of the tap coefficients for the segments, the computational means that create the echo replica are assigned. That contributes to optimization of the computational requirements per segment, and reducing the computational requirements and the amount of memory in whole system.

When the power of the tap coefficients h(t) for the segments is above the predetermined threshold, the product for the segments is computed using the 16 bits processor 112. When the power of the tap coefficients h(t) for the segments is below the predetermined threshold, the product for the segments is computed using the 8 bits processor 114. That contributes to optimization of the computational requirements per segments, and reducing the computational requirements and the amount of memory in whole system.

As described above, because of reducing the computational requirements and the amount of memory in whole system, it is possible to compute for the long tap coefficients, and improve the echo canceling performance.

Next, a second embodiment will be described.

Figure 4:
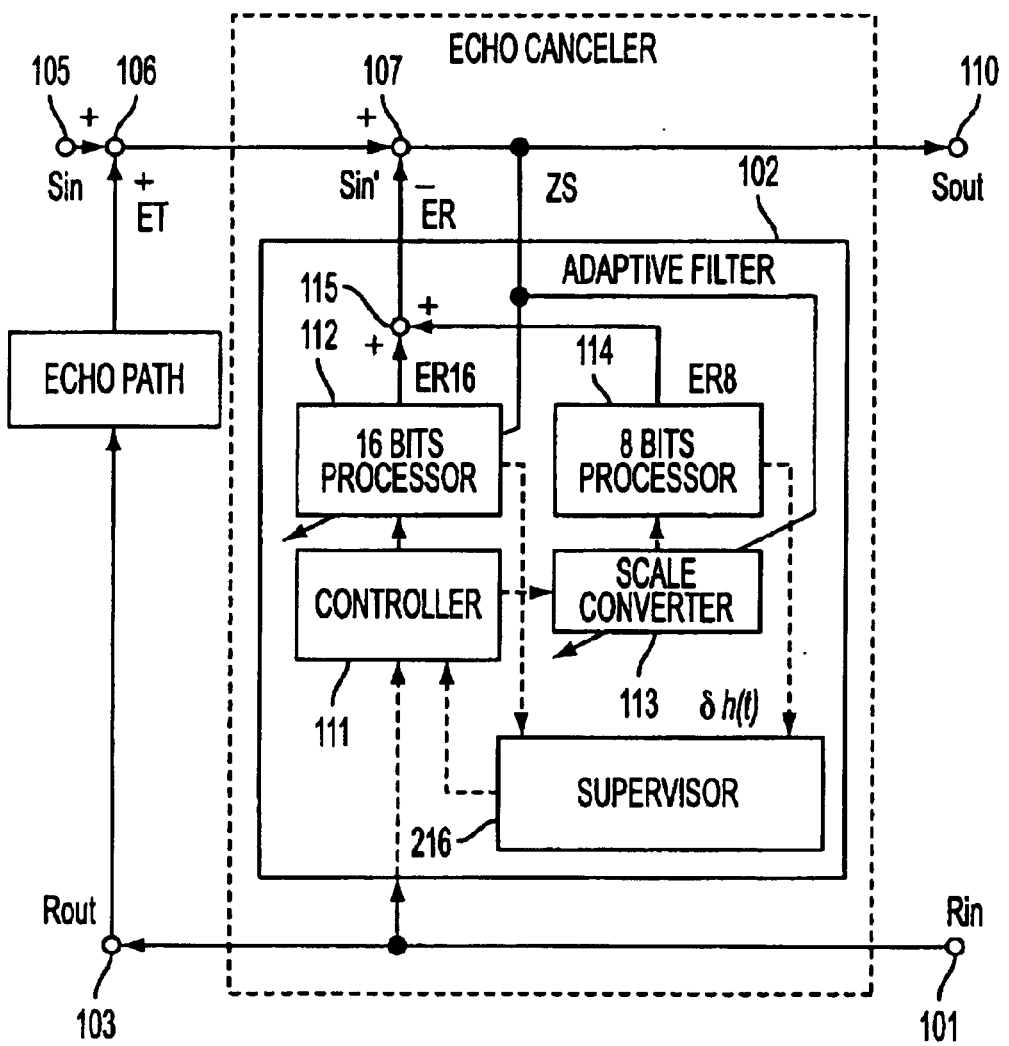
FIG. 4 is a block diagram of a second embodiment of the invention.

FIG. 4 shows a block diagram of a second embodiment of the invention using the same reference numerals as in FIG. 1 for identical or equivalent elements.

In the second embodiment of the invention, as a rule, the 8 bits processor 114 is used for computation, and the 16 bits processor 112 is used for computation for the segment that an overflow occurs.

As described above, the transfer characteristics of the echo path has significant responses at the leading edge, and attenuates gradually.

If 8 bits computation is used for all of the transfer characteristics of the echo path, the overflow will occur at the leading edge. If 16 bits computation is used for all of the transfer characteristics of the echo path, the lower 2 or 3 bits of 16 bits will be only used for the computation. In such a case, the computational ability of system is not used effectively.

The echo canceler in the second embodiment computes using 8 bits computation for a general computation, and using 16 bits computation when the overflow occurs.

That is the echo canceler creates the echo replica ER8 using 8 bits computation that does not require extensive computation. At the leading edge, 16 bits computation is used for the segment that the overflow occurs.

The new element in the second embodiment is a supervisor 216, which comprises an overflow detecting function and an order function for ordering reassignment to the controller 111.

The 8 bits processor 114 multiplies the tap coefficients h(t) by the local input signal series x(t) using the equation (1). For example, 8 bits code multiplied by 8 bits code is 16 bits. To detect whether the overflow of parameter occurs or not, the supervisor 216 supervises the local input signal x(t) of the 8 bits processor 114, the tap coefficients concerned with multiply-add computations, or adjusting degree of the tap coefficients.

The local input signal Rin that is assigned once and the overflow occurs is reassigned to the 16 bits processor 112 according to order from the controller 111.

The time for computation when the overflow occurs can be delayed. In order to delay, for example, an overflow storing means is comprised, and stores the local input signal series and the tap coefficients h(t) for the segments that the overflow occurs, and computation for the last one segment is done before present computation. Also, it is possible that the 8 bits processor 114 and the 16 bits processor 112 are connected and compute together according to order from the controller 111.

The supervisor 216 can indicate the detecting information of the overflow to the controller 111 by showing that the adaptive filter 102 becomes an overflow mode. For example, it is possible to reassign the local input signal Rin for the overflow mode using the flag indicating the overflow to the controller 111.

The controller 111 reassigns the local input signal Rin to the 16 bits processor 112 according to the order from the supervisor 216. The echo replica ER16 is created by multiplying the local input signal Rin by the tap coefficients h(t) that is stored in the 16 bits processor 112.

Next, the overall operation of the second embodiment will be described.

The adaptive filtering of the adaptive filter 102 in the second embodiment is computed using the 8 bits processor 114 in the adaptive filter 102. That is different from the first embodiment.

The local input signal Rin supplied from the local input terminal 101 per sample is converted into 8 bits through the scale converter 113, and supplied to the 8 bits processor 114.

The 8 bits processor 114 creates the echo replica ER8 per the segment by computing of the local input signal Rin and the tap coefficients h(t) using the equation (1), and the adder 115 adds the echo replica ER8 per the segment, and creates the echo replica ER.

For example, the overflow occurs because of multiplication of tap coefficients h(t) for segments supplied to the 8 bits processor 114 and the local input signal Rin. The multiplication exceeds computational accuracy of the 8 bits processor 114.

The supervisor 216 supervises the occurrence of the overflow, and informs it to the controller 111.

The local input signal for segments that the overflow occurs is reassigned to the 16 bits processor 112 according to the order from the controller 111. The 16 bits processor 112 stores the tap coefficients h(t) comprised of 16 bits parameter for the segments, and creates the echo replica ER16 using the coefficients h(t).

The echo replica ER is created by the adder 115 by adding the echo replica ER8 created using the 8 bits processor 114 to the echo replica ER16 created by the 16 bits processor 112 using the reassigned local input Rin because of the overflow.

As described above, according to the transfer characteristics of the echo path, the tap coefficients are grouped into the segments, and according to the power of the tap coefficients for the segments, the computational means that create the echo replica are assigned. That contributes to optimization of the computational requirements per segment, and reducing the computational requirements and the amount of memory in whole system.

The overflow supervisor supervises the adjusting degree of the tap coefficients and the tap coefficients for the segments. It is possible to optimize the computational requirements per segment using accurate computing means for the segment that the overflow occurs. That contributes to reducing the computational requirements and the amount of memory in whole system.

Next, a third embodiment will be described.

Figure 5:
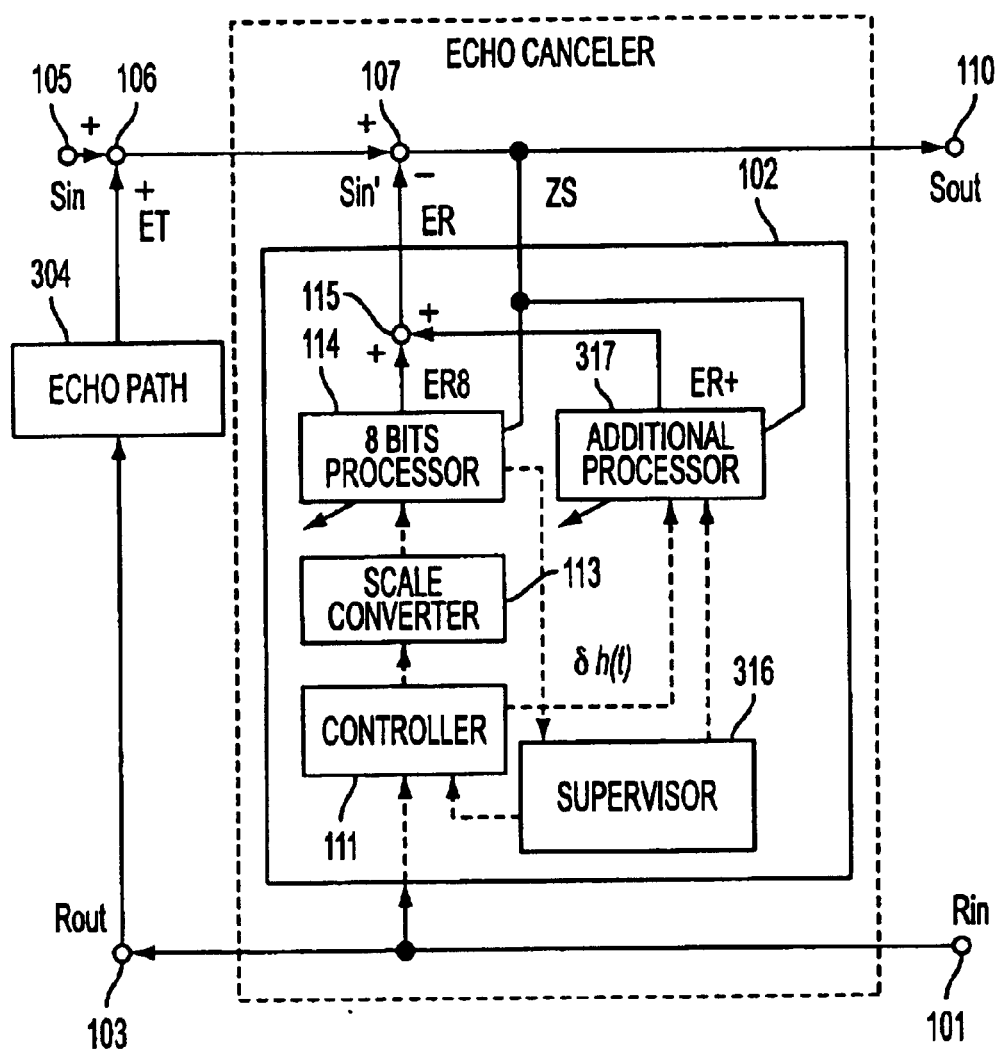
FIG. 5 is a block diagram of a third embodiment of the invention.

FIG. 5 shows the third embodiment, using the same reference numerals as in FIG. 1 for identical or equivalent elements.

The adaptive filter 102 in the third embodiment comprises the 8 bits processor 114, the scale converter 113, the controller 111, an additional processor 317, and a supervisor 316.

In the third embodiment, the 8 bits processor 114 is used for usual computation, which is the same as the second embodiment. When the overflow occurs, 16 bits computation, which extends 8 bits computation, is used for the segments as a whole system, which is different from the second embodiment.

The additional processor 317 uses 8 bits parameter. When the overflow occurs, the additional processor 317 computes using the 8 bits processor 114, which is extended to 16 bits computation, for the segment assigned by the controller 111.

Also, the additional processor 317 creates an additional echo replica ER+, and supplies it to the adder 115.

The time for computation when the overflow occurs can be delayed. In order to delay, for example, an overflow storing means, not shown, is comprised, and stores the local input signal series x(t) and the tap coefficients h(t) for the segments that the overflow occurs in the adaptive filter 102, and computation for the last one segment is computed before present computation. Also, it is possible that the 8 bits processor 114 and the additional processor 317 are connected and compute together according to order from the controller 111. The accurate 16 bits computation as a whole system is the purpose. The time and method for computation is not limited to the embodiment.

The supervisor 316 supervises the adjusting degree of the tap coefficients and the tap coefficients in the 8 bits processor 114, and indicates the extension of computational accuracy to the controller 111 when the overflow of parameters occurs.

The controller 111 assigns computation for each segment to the 8 bits processor 114 and the additional processor 317, and according to an extending order of computational accuracy from the supervisor 316. In usual computation, the echo replica ER8 is created only by computation of the 8 bits processor 114 using 8 bits parameters. The echo replica ER is created by the sum of the echo replica ER8. When the supervisor 316 detects the overflow, and receives extending order of computational accuracy from the supervisor 316, computation for segments that the overflow occurs is assigned to the additional processor 317.

As described above, because the additional computing means is used for the segments that the overflow occurs, it is possible to optimize the computational requirements to the transfer characteristics of the echo path per segment. That contributes to reducing the computational requirements and the amount of memory in whole system.

Because of the computational requirements in whole system, it is possible to compute for the more tap coefficients, and correspond to the longer echo path. That contributes to improve the echo canceling performance.

The above three of many possible embodiments of the present invention uses the transfer characteristics of the echo path of the 8 bits processor 114 and the 16 bits processor 112 as decision means. The decision means is not limited to the transfer characteristics of the echo path. It is possible to use the means that can estimate computational requirement of the adaptive filter 102.

The processor 112 and 114 are not limited to 8 bits processor and 16 bits processor. For example, it is possible to use 32 bits processor.

The above are only three of many possible embodiments of the present invention. Other embodiments can be obtained by using different algorithms for adjusting the tap coefficients in the normal mode, such as various known variations of the least mean squares algorithm, the recursive least squares (RLS) algorithms, or the Kalman filtering algorithm.

The present invention is not limited to application in acoustic echo cancelers, but can also be applied to electrical echo cancelers, such as echo cancelers that cancel electrical echo signals arising in the hybrid coils that convert between two-wire and four-wire telephone circuits.

The invention can be practiced in both hardware-based echo cancelers and software-based echo cancelers.

While the present invention has been described with reference to the illustrative embodiments, it is not to be restricted by the embodiments. It is to be appreciated that those skilled in the art can change or modify the embodiments without departing from the scope and spirit of the present invention.

What is claimed is:

1. An echo canceler for generating an echo replica and for subtracting the echo replica from a local input signal to create a residual signal for outgoing transmission, comprising:

a plurality of processors which have different computational accuracy for generating the echo replica; and a controller coupled to said processors for grouping coefficients into a plurality of segments, evaluating a computational accuracy information according to the coefficients for said segments, assigning said local input signal into said processors for higher computational accuracy when the power of each of said segments is above a predefined threshold, and adjusting the coefficients according to the computational accuracy information.

2. The echo canceler of claim 1, wherein the computational accuracy information is a power of the coefficients for each one of said segments.

3. The echo canceler of claim 1, further comprising a supervisor for monitoring a computational overflow for each segment which is assigned to said processor for lower computational accuracy according to the computational accuracy information, and ordering said controller to assign the local input signal to said processor for higher computational accuracy when the overflow occurs in the segment.

4. The echo canceler of claim 1, further comprising a supervisor for monitoring a computational overflow for each segment which is assigned to said processor for lower computational accuracy according to the computational accuracy information, and ordering said controller to assign the local input signal to an additional processor when the overflow occurs in the segment.

5. A method of canceling an echo component of a local input signal to create a residual signal for outgoing transmission, comprising the steps of:

grouping coefficients into a plurality of segments;

evaluating a computational accuracy information according to the coefficients for said segments;

assigning said local input signal to a processor for higher computational accuracy when the power for each one of said segments is above a predefined threshold; and adjusting the coefficients.

6. A method according to claim 5, wherein said step of evaluating a computational accuracy information is a power of the coefficients for each one of said segments.

7. A method according to claim 5, comprising the additional steps of:

monitoring a computational overflow for each segment which is assigned to a processor for lower computational accuracy according to the computational accuracy information; and ordering said controller to assign the local input signal to a processor for higher computational accuracy when the overflow occurs in the segment.

8. A method according to claim 5, comprising the additional steps of:

monitoring a computational overflow for each segment which is assigned to a processor for lower computational accuracy according to the computational accuracy information; and ordering said controller to assign the local input signal to an additional processor when the overflow occurs in the segment.

9. An echo canceler for generating an echo replica and for subtracting the echo replica from a local input signal to create a residual signal for outgoing transmission, comprising:

a plurality of processors which have different computational accuracy for generating the echo replica; and a controller coupled to said processors for grouping coefficients into a plurality of segments, evaluating a computational accuracy information according to the coefficients for said segments, assigning said local input signal into said processors for lower computational accuracy when the power of each of said segments is below a predefined threshold, and adjusting the coefficients according to the computational accuracy.

10. The echo canceler of claim 9, wherein the computational accuracy information is a power of the coefficients for each one of said segments.

11. The echo canceler of claim 9, further comprising a supervisor for monitoring a computational overflow for each segment which is assigned to said processor for lower computational accuracy according to the computational accuracy information, and ordering said controller to assign the local input signal to said processor for higher computational accuracy when the overflow occurs in the segment.

12. The echo canceler of claim 9, further comprising a supervisor for monitoring a computational overflow for each segment which is assigned to said processor for lower computational accuracy according to the computational accuracy information, and ordering said controller to assign the local input signal to an additional processor when the overflow occurs in the segment.

13. A method of canceling an echo component of a local input signal to create a residual signal for outgoing transmission, comprising the steps of:

grouping coefficients into a plurality of segments;

evaluating a computational accuracy information according to the coefficients for said segments;

assigning said local input signal to a processor for lower computational accuracy when the power for each one of said segments is below a predefined threshold; and adjusting the coefficients.

14. A method according to claim 13, wherein said step of evaluating a computational accuracy information is a power of the coefficients for each one of said segments.

15. A method according to claim 13, comprising the additional steps of:

monitoring a computational overflow for each segments which is assigned to a processor for lower computational accuracy according to the computational accuracy information; and ordering said controller to assign the local input signal to a processor for higher computational accuracy when the overflow occurs in the segment.

16. A method according to claim 13, comprising the additional steps of:

monitoring a computational overflow for each segment which is assigned to a processor for lower computational accuracy according to the computational accuracy information; and ordering said controller to assign the local input signal to an additional processor when the overflow occurs in the segments.

* * * * *